US 7,440,996 B2

(12) United States Patent
Gebhart (10) Patent No.: US 7,440,996 B2
(45) Date of Patent: Oct. 21, 2008

(54) DYNAMIC COMPONENT TRANSFER

(75) Inventor: Alexander Gebhart, Bad Schönborn (DE)

(73) Assignee: SAP AG, Walldorf (DE)

( * ) Notice: Subject to any disclaimer, the term of this patent is extended or adjusted under 35 U.S.C. 154(b) by 1053 days.

(21) Appl. No.: 10/309,415

(22) Filed: Dec. 3, 2002

(65) Prior Publication Data

US 2003/0158915 A1 Aug. 21, 2003

Related U.S. Application Data

(60) Provisional application No. 60/337,140, filed on Dec. 10, 2001.

(51) Int. Cl.
*G06F 15/16* (2006.01)
(52) U.S. Cl. .......................... 709/203; 705/27
(58) Field of Classification Search .............. 709/203, 709/219, 225, 231, 223, 224, 229; 705/39, 705/78, 9, 14, 26, 27; 707/1, 513, 10, 104; 715/513; 717/173; 718/105
See application file for complete search history.

(56) References Cited

U.S. PATENT DOCUMENTS

| | | | | |
|---|---|---|---|---|
| 5,442,791 A | * | 8/1995 | Wrabetz et al. ............. | 719/330 |
| 5,659,735 A | * | 8/1997 | Parrish et al. ............... | 707/10 |
| 5,933,646 A | * | 8/1999 | Hendrickson et al. ....... | 717/169 |
| 5,999,740 A | | 12/1999 | Rowley | |
| 6,009,274 A | | 12/1999 | Fletcher et al. | |
| 6,317,754 B1 | * | 11/2001 | Peng ......................... | 707/203 |
| 6,347,398 B1 | | 2/2002 | Parthasarathy et al. | |
| 6,567,841 B1 | * | 5/2003 | Rooney et al. ............. | 718/104 |
| 6,574,655 B1 | * | 6/2003 | Libert et al. ................ | 709/200 |
| 6,678,715 B1 | * | 1/2004 | Ando ......................... | 718/105 |
| 6,708,217 B1 | * | 3/2004 | Colson et al. .............. | 709/231 |
| 6,757,899 B2 | * | 6/2004 | Zhdankin et al. ............ | 719/315 |
| 6,795,830 B1 | * | 9/2004 | Banerjee et al. ............ | 707/200 |
| 6,820,136 B1 | * | 11/2004 | Pham et al. ................ | 709/248 |
| 6,832,239 B1 | * | 12/2004 | Kraft et al. ................. | 709/203 |
| 6,834,341 B1 | * | 12/2004 | Bahl et al. .................. | 713/156 |
| 6,931,429 B2 | * | 8/2005 | Gouge et al. ............... | 709/203 |
| 6,934,756 B2 | * | 8/2005 | Maes ......................... | 709/227 |
| 6,948,059 B1 | * | 9/2005 | Sprecher et al. ............ | 713/100 |
| 6,954,755 B2 | * | 10/2005 | Reisman ..................... | 707/10 |
| 6,957,199 B1 | * | 10/2005 | Fisher ........................ | 705/78 |
| 6,961,760 B2 | * | 11/2005 | Li et al. ..................... | 709/219 |
| 6,968,346 B2 | * | 11/2005 | Hekmatpour ............. | 707/104.1 |
| 6,976,079 B1 | * | 12/2005 | Ferguson et al. ........... | 709/229 |
| 6,985,939 B2 | * | 1/2006 | Fletcher et al. ............. | 709/223 |

(Continued)

OTHER PUBLICATIONS

Towards Automated SLA Management for Web Services—Sahai, al. (2001) □□www.hpl.hp.com/techreports/2001/HPL-2001-310R1.pdf.*

(Continued)

*Primary Examiner*—Thong H Vu
(74) *Attorney, Agent, or Firm*—Finnegan, Henderson, Farabow, Garrett & Dunner, L.L.P.

(57) ABSTRACT

Methods and apparatus, including computer program products. In one embodiment, a client server method includes storing components in a first server, storing a list of the components in a second server, requesting, by an application residing in a client, a component matching particular functioned requirements from the list, negotiating between the first server and the client, and executing the component in response to the negotiation.

21 Claims, 6 Drawing Sheets

U.S. PATENT DOCUMENTS

| | | | |
|---|---|---|---|
| 6,993,657 B1* | 1/2006 | Renner et al. | 713/182 |
| 7,013,290 B2* | 3/2006 | Ananian | 705/27 |
| 7,028,306 B2* | 4/2006 | Boloker et al. | 719/310 |
| 7,080,092 B2* | 7/2006 | Upton | 707/102 |
| 7,113,919 B1* | 9/2006 | Norris et al. | 705/26 |
| 7,200,681 B1* | 4/2007 | Lewin et al. | 709/246 |
| 2002/0065912 A1* | 5/2002 | Catchpole et al. | 709/224 |
| 2002/0143560 A1* | 10/2002 | Hanson et al. | 705/1 |
| 2002/0143626 A1* | 10/2002 | Voltmer et al. | 705/14 |
| 2002/0143641 A1* | 10/2002 | Thomas et al. | 705/26 |
| 2002/0143819 A1* | 10/2002 | Han et al. | 707/513 |
| 2002/0143944 A1* | 10/2002 | Traversat et al. | 709/225 |
| 2002/0161745 A1* | 10/2002 | Call | 707/1 |
| 2002/0165856 A1* | 11/2002 | Gilfillan et al. | 707/3 |
| 2002/0165993 A1* | 11/2002 | Kramer | 709/315 |
| 2002/0178214 A1* | 11/2002 | Brittenham et al. | 709/203 |
| 2002/0184065 A1* | 12/2002 | Menard et al. | 705/7 |
| 2003/0004746 A1* | 1/2003 | Kheirolomoom et al. | 705/1 |
| 2003/0033369 A1* | 2/2003 | Bernhard | 709/203 |
| 2003/0055776 A1* | 3/2003 | Samuelson | 705/37 |
| 2003/0084056 A1* | 5/2003 | DeAnna et al. | 707/100 |
| 2003/0088421 A1* | 5/2003 | Maes et al. | 704/270.1 |
| 2003/0110044 A1* | 6/2003 | Nix et al. | 705/1 |
| 2003/0120593 A1* | 6/2003 | Bansal et al. | 705/39 |
| 2003/0126000 A1* | 7/2003 | Clendenin | 705/7 |
| 2003/0140107 A1* | 7/2003 | Rezvani et al. | 709/208 |
| 2004/0015953 A1* | 1/2004 | Vincent | 717/173 |
| 2004/0133460 A1* | 7/2004 | Berlin et al. | 705/9 |
| 2004/0205772 A1* | 10/2004 | Uszok et al. | 719/317 |
| 2005/0086252 A1* | 4/2005 | Jones et al. | 707/102 |
| 2005/0144557 A1* | 6/2005 | Li et al. | 715/513 |
| 2005/0209950 A1* | 9/2005 | Clark | 705/37 |
| 2006/0053056 A1* | 3/2006 | Alspach-Goss et al. | 705/14 |

OTHER PUBLICATIONS

Network Working Group M. Mealling Request for Comments: 3688 . . . —The Ietf Xml☐☐www.tzi.de/~cabo/pdfrfc/rfc3688.txt.pdf.*

A Java/CORBA based Visual Program Composition . . . —Shields, Rana . . . (2000) www.cm.cf.ac.uk/user/M.S.Shields/docs/publications/shields-rana-walker-li-golby-final.ps.gz.*

The Use of XML in Software Engineering—Tatbul (2000) ☐☐www.cs.brown.edu/people/tatbul/cs234/paper.ps.*

Role of Technology in Enabling Dynamic Virtual Enterprises—Nitin Nayak Tian (2001) cersi.luiss.it/oesseo2001/papers/13.pdf.*

WebOS: Operating System Services for Wide Area . . . —Vahdat, Belani . . . (1997) now.cs.berkeley.edu/WebOS/papers/webos-overview.ps.*

Change-Centric Management of Versions in an XML Warehouse—Marian, Abiteboul, Mignet (2000) www-rocq.inria.fr/~ mignet/Publications/bda2000-ver.ps.gz.*

Search Report mailed Sep. 20, 2007, in corresponding European Application No. 02024417.4-2211.

Akkiraju et al., "A Framework for Facilitating Dynamic e-Business Via Web Services," Oct. 15, 2001, 4 pages, IBM T.J. Watson Research Center, Yorktown Heights, NY.

Brittenham et al., "Understanding WSDL in a UDDI Register," Aug. 20, 2001, 38 pages, Somers, NY.

Curbera et al., "Using ESDL in a UDDI Registry 1.05, UDDI Working Draft Best Practices Document," Jun. 25, 2001, 9 pages, International Business Machines Corp., Intel Corporation, Microsoft Corp.

Gisolfi, D., "Web services architect: Part 1, An introduction to dynamic e-business," Apr. 1, 2001, 7 pages.

Sleeper, B., "The Stencil Scope, An Analysis Memo from The Stencil Group, Why UDDI Will Succeed, Quietly, Two Factors Push Web Services Forward" Apr. 2001, 7 pages, The Stencil Group.

"UDDI Technical White Paper," Sep. 6, 2000, 13 pages, Accenture, Ariba, Inc., Commerce One, Inc., Fujitsu Limited, Hewlett-Packard Company, i2 Technologies, Inc, Intel Corporation, International Business Machines Corporation, Microsoft Corporation, Oracle Corporation, SAP AG, Sun Microsystems, Inc., and VeriSign, Inc.

Ehnebuske et al., "UDDI Version 2.0 Data Structure Reference, UDDI Open Draft Specification Jun. 8, 2001," 37 pages, Accenture, Ariba, Inc., Commerce One, Inc., Fujitsu Limited, Hewlett-Packard Company, i2 Technologies, Inc, Intel Corporation, International Business Machines Corporation, Microsoft Corporation, Oracle Corporation, SAP AG, Sun Microsystems, Inc., and VeriSign, Inc.

McKee et al., "UDDI Version 2.0 Data API Specification, UDDI Open Draft Specification Jun. 8, 2001," 81 pages, Accenture, Ariba, Inc., Commerce One, Inc., Fujitsu Limited, Hewlett-Packard Company, i2 Technologies, Inc, Intel Corporation, International Business Machines Corporation, Microsoft Corporation, Oracle Corporation, SAP AG, Sun Microsystems, Inc., and VeriSign, Inc.

* cited by examiner

```xml
<xml>
    <component_resource_description>
        <removeable>
            true
        </removeable>
        <size_in_byte>
            5000
        </size_in_byte>
        <language>
            java
        </language>
        <required_jdk>
            1.4
        </required_jdk>
        <minimum_disk_space_required_in_byte>
            10000
        </minimum_disk_space_required_in_byte>
        ...
    </component_resource_description>
</xml>
```

FIG. 4

```
<xml>
    <client_computer_resource_description>
        <available_disk_space_in_byte>
            50000000
        </available_disk_space_in_byte>
        <network_speed_in_mbit_per_second>
            100
        <network_speed_in_mbit_per_second>
        <available_jdks>
            1.1.8
            1.2
            1.3
            1.4
        </available_jdks>
        <os>
            Win2000
        </os>
        </application_language>
            java
        </application_language>
        ...
    </client_computer_resource_description>
</xml>
```

DYNAMIC COMPONENT TRANSFER

CROSS-REFERENCE TO RELATED APPLICATIONS

This application claims priority to U.S. Provisional Application No. 60/337,140, entitled Dynamic Component Transfer Based On Resource Negotiations Between Computer Systems, filed Dec. 10, 2001, the disclosure of which is incorporated herein by reference in its entirety.

BACKGROUND

The present application relates to data processing by digital computers, and more particularly to dynamic component transfer.

The Internet is a worldwide system of computer networks. The Internet is a public, cooperative, and self-sustaining facility accessible to hundreds of millions of people worldwide. Physically, the Internet uses a portion of the total resources of the currently existing public telecommunication networks.

A client/server model has become one of the central ideas of network computing. Client/server describes a relationship between two computer programs in which one program, the client, makes a service request from another program, the server, which fulfills the request. Although programs within a single computer can use the client/server model, it is a more important idea in a network. In a network, the client/server model provides a convenient way to interconnect programs that are distributed across different locations. Typically, multiple client programs share the services of a common server program. Both client programs and server programs are often part of a larger program or application. Relative to the Internet, a Web browser is a client program that requests services (the sending of Web pages or files) from a Web server (which is often called a Hypertext Transport Protocol or HTTP server) in another computer somewhere on the Internet.

SUMMARY

The present invention provides methods and apparatus, including computer program products, which can be used in dynamic component transfer between computer systems in a network.

In one aspect, the invention features a method of dynamic component transfer between systems in a network. The method includes storing components in a first server, storing a list of the components in a second server, requesting, by an application residing in a client, a component from the list, and determining where to execute the requested component according to resource information.

One or more of the following advantageous features can also be included. Determining can include comparing resource information in the first server with resource information in the client. Executing can be in response to determining. Resource information can include free disk capacity, processor speed, operating system, installed applications and size of requested component.

In another aspect, the invention features a client server method. The method includes storing components in a first server, storing a list of the components in a second server, requesting, by an application residing in a client, a component from the list, negotiating between the first server and the client, and executing the component in response to the negotiation.

One or more of the following advantageous features can also be included. The first server can be a Universal Description, Discovery and Integration (UDDI) server.

In embodiments, negotiating can include comparing resource information contained in the client with resource information contained in the second server, and in response to comparing, determining whether to execute the component on the client or on the first server. The resource information in the client can be stored in a first XML structure and the resource information in the first server in stored as second XML structure.

Negotiating can include correspondence between a first resource agent residing on the client and a second resource agent residing on the first server.

In another aspect, the invention features a method for automatically using computer software components by an application on a client computer that is connected to a computer network. The method includes deploying components on a first server, registering the components in a second server, requesting a particular component by sending a functionality specification of the particular component from the client computer with the application to the second server, searching in the second server for register entries that match the functionality specification, returning a list of matching components to the application, and executing a matching component under control of the application.

One or more of the following advantageous features can also be included. Registering can be performed with the first server being a UDDI server. Registering can be performed by describing the component in WSDL.

In embodiments, registering can be performed by describing a location of the component and an invocation of the component. Searching can include using a UDDI description in WSDL in the second server. Returning a list can also include performing a negotiation between client and first server. Performing the negotiation can include using resource information about the components. Using resource information can include reading a text structure and/or reading the text structure as an XML structure. Reading the XML structure can include reading indications from the group selected from {removeability, size, language, language version, disk capacity, processor speed, operating system, details of applications}.

In embodiments, performing the negotiation can include at least one resource agent. The resource agent can include a server-side agent and a client-side agent. The resource agent can control component execution.

Executing can include accessing the matching component by a Simple Object Access Protocol (SOAP). Executing can include composing an application from a plurality of components from the component server. Composing can include starting from an application stub on the client.

Embodiments of the invention can have one or more of the following advantages.

Entire components (or parts of components) can be moved from a component server system to a client system dynamically by automatic negotiation between the client system as a component user and the server system as a component provider. Client system and server system negotiate directly or indirectly. The component server is supported by a UDDI server.

Resource information that is necessary to enable a component to be moved is available to the client and to the server. An exchange of component information using a protocol during a negotiation enables client system and server system to dynamically compose whole applications from local components on the client system and from remote components on the component server system.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
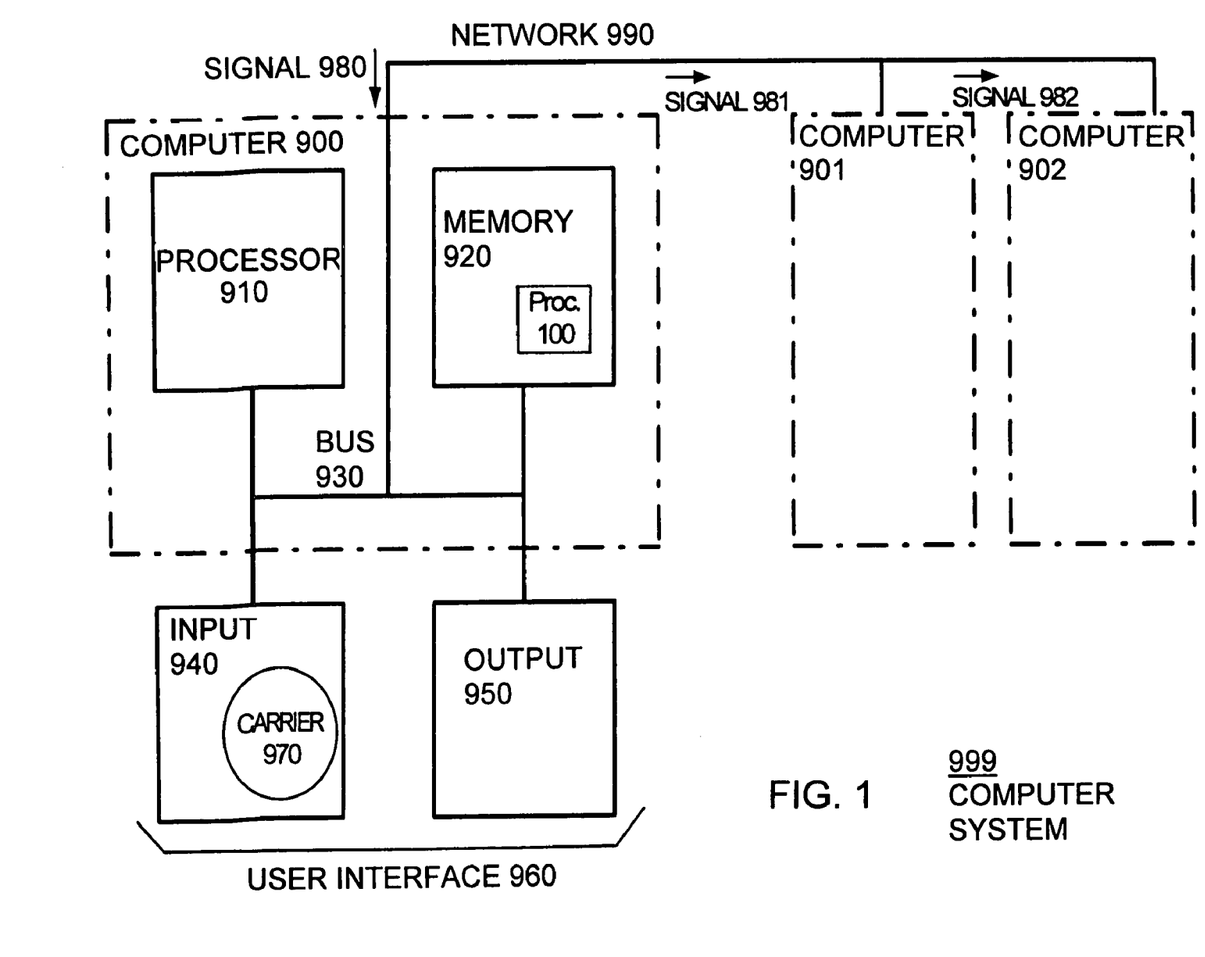
FIG. 1 is a block diagram of a client/server network.

As shown in FIG. 1, an exemplary client/server network 999 includes computers 900, 901, 902. Computer 900 communicates with computers 901 and 902 over network 990. Computer 900 includes, for example, processor 910, memory 920, bus 930, and, optionally, input device 940 and output device 950. Devices 940, 950 are sometimes referred to as a user interface (UI) 960. Memory 920 includes a dynamic component transfer process 100, described below. Within client/server network 999, computers 901, 902 are sometimes referred to as "remote computers" relative to computer 900, which is generally referred to as a "local computer." Networks, such as client server network 999, are commonplace in offices, enterprise-wide computer networks, intranets and the Internet (e.g., World Wide Web). Network 990 can be a wired or a wireless network.

Figure 2:
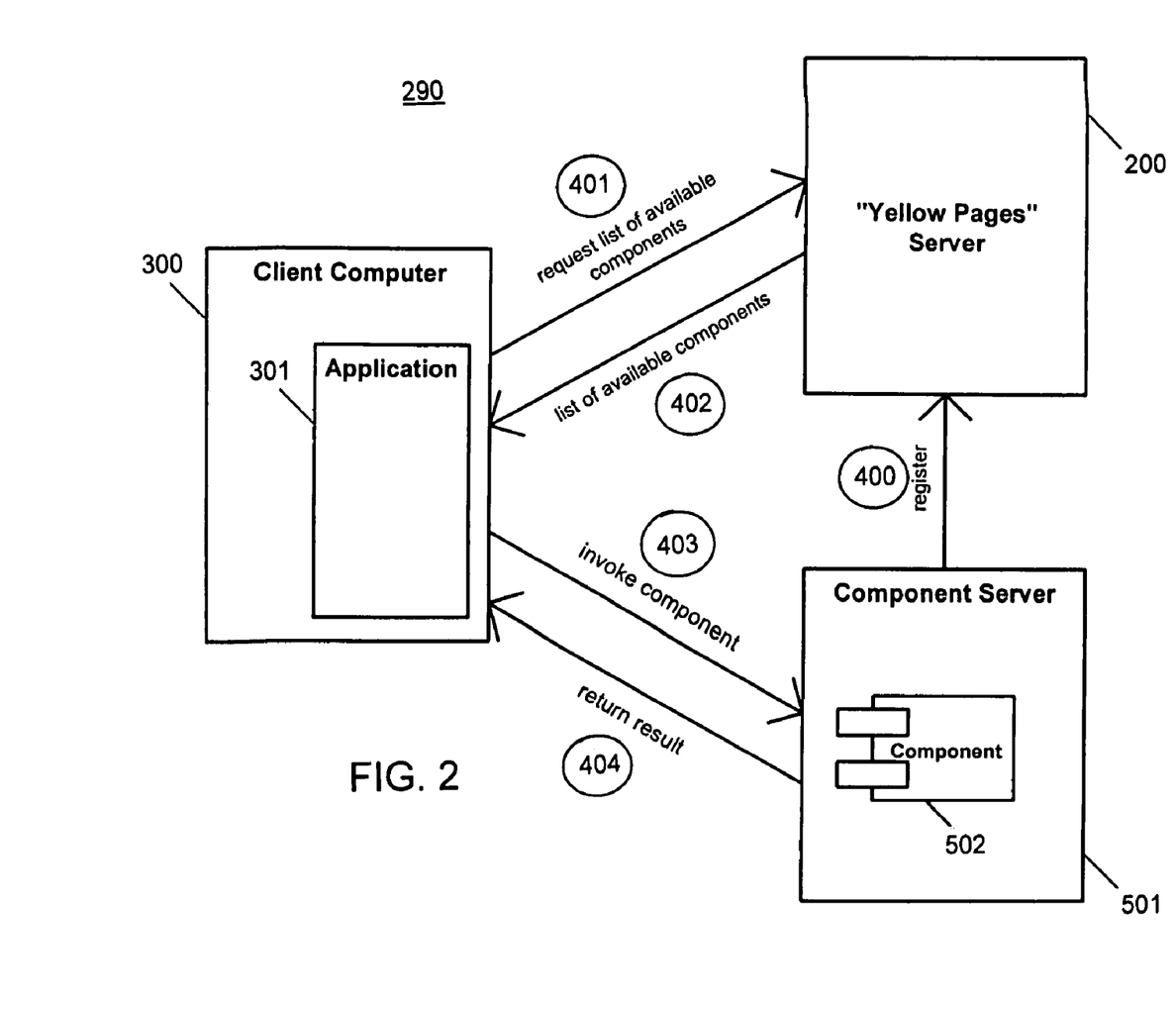
FIG. 2 is a block diagram of a first network.

As shown in FIG. 2, a network 290 includes a client system 300, a component server 501 and a UDDI server 200. UDDI (Universal Description, Discovery, and Integration) is an XML-based registry for businesses worldwide on the Internet. XML is a flexible way to generate common information formats and share both the format and the data on the World Wide Web (Web), intranets, and elsewhere. XML, a formal recommendation from the World Wide Web Consortium (W3C), is similar to the language of today's Web pages, the Hypertext Markup Language (HTML). Both XML and HTML contain markup symbols to describe the contents of a page or file. HTML, however, describes the content of a Web page (mainly text and graphic images) in terms of how it is to be displayed and interacted with.

UDDI's goal is to streamline online transactions by enabling companies to find one another on the Web and make their systems interoperable for electronic commerce (e-commerce). UDDI is often compared to a telephone book's white, yellow, and green pages. The UDDI project allows businesses to list themselves by name, product, location, or the Web services they offer. The UDDI specification utilizes W3C and Internet Engineering Task Force (IETF) standards such as XML, HTTP, and Domain Name System (DNS) protocols. UDDI has also adopted early versions of the proposed Simple Object Access Protocol (SOAP) messaging guidelines for cross platform programming.

A process of discovering and using remote components includes deploying components 502 to component server 501. In object-oriented programming and distributed object technology, a component is a reusable program building block that can be combined with other components in the same or other computers in a distributed network, such as network 290, to form an application, such as application 301 in client 300. Examples of components include, for example, a single button in a graphical user interface, a small interest calculator, and an interface to a database manager. Components can be deployed on different servers in a network, such as component server 501, and communicate with each other for needed services. A component runs within a context called a container. Examples of containers include pages on a Web site, Web browsers, and word processors.

The components 502 are registered (400) in UDDI server 200 in a list or registry generally referred to as yellow pages. The components 502 are described inside UDDI server 200 by WSDL. WSDL is an XML-based language used to describe the services a business offers and to provide a way for individuals and other businesses to access those services electronically. Typical information contained in the UDDI server 200 relates to the location of the components 502 and how the components 502 are invoked.

As application 301 on client 300 needs a particular component 502 on component server 501, application 301 sends (401) a request to server 200. The request specifies a required functionality of the component needed. Server 200 searches its registered entries for components that match the required functionality and server 200 sends (402) a result to client 300.

Application 301 on client 300 accesses or invokes (403) the component 502 on component server 501 in response to the result. Access can take place via SOAP or similar method. SOAP (Simple Object Access Protocol) is a way for a program running in one kind of operating system (such as Windows NT) to communicate with a program in the same or another kind of an operating system (such as Linux) by using HTTP and XML as the mechanisms for information exchange. Since Web protocols are installed and available for use by all major operating system platforms, HTTP and XML provide a solution to the problem of how programs running under different operating systems in a network can communicate with each other. SOAP specifies exactly how to encode an HTTP header and an XML file so that a program in one computer can call a program in another computer and pass it information. SOAP also specifies how the called program can return a response.

In one example, the component 502 executes on the component server 501. When completed, the component 502 returns (404) its result to the application 301 on the client 300.

Figure 3:
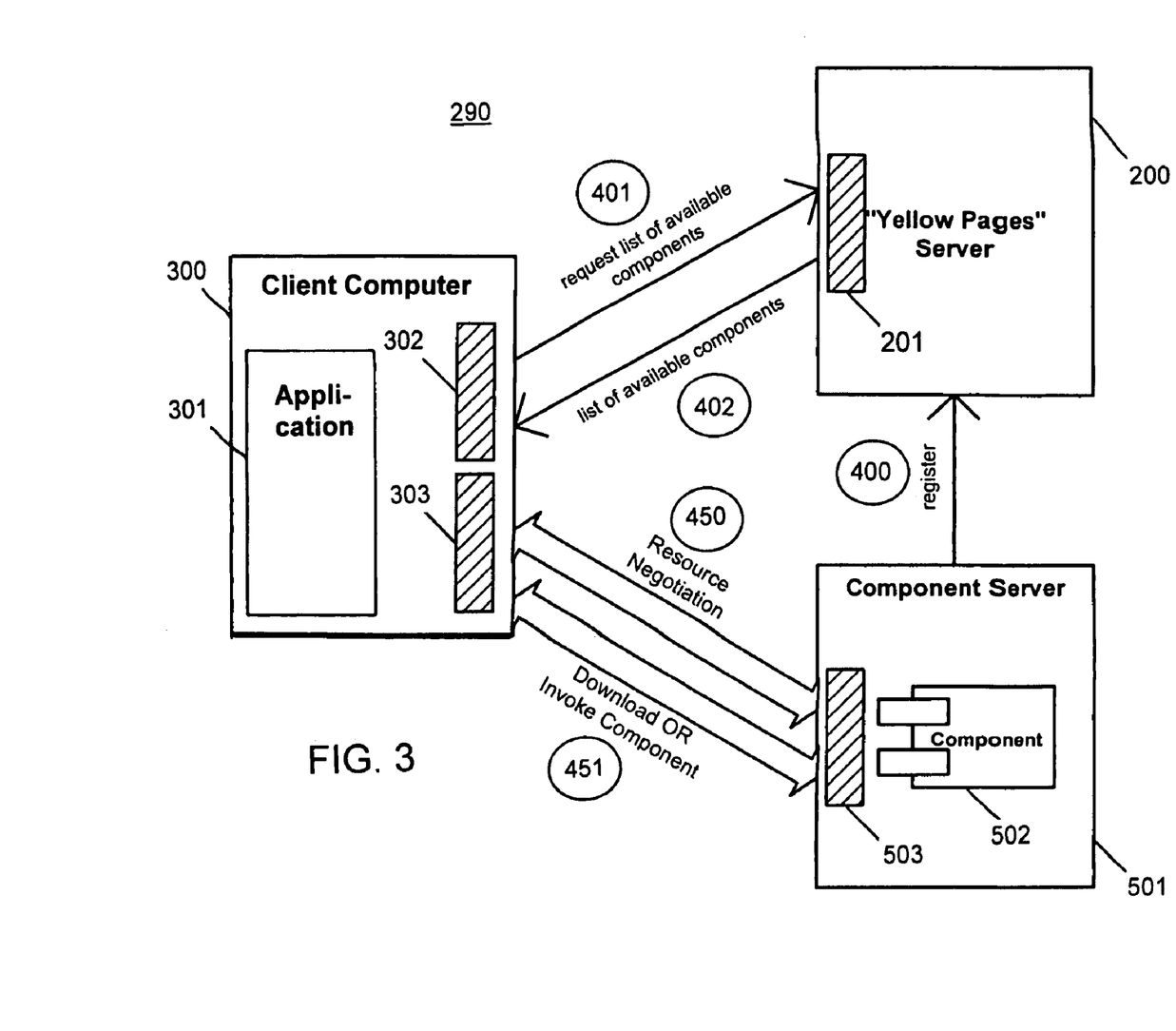
FIG. 3 is a block diagram of a second network.

As shown in FIG. 3, the network 290 includes client system 300, component server 501 and UDDI server 200. Application 301 on the client 300 receives (402) a list of possible components from UDDI server 200. Application 301 on client 300 negotiates (450) with component 502 on component server 501. For example, in negotiating (450), the component 502 includes resource information about itself. This resource information is represented, for example, in a first XML data structure. Application 301 contains resource information about client 300. This resource information is retrieved by application 301 and is represented, for example, in a second XML data structure. If some resource information is missing, application 301 halts negotiating (450) and uses the component 502.

Resource information is exchanged using a defined protocol. Requesting specific resource information by application 301 and stopping negotiation (450) once all relevant resource information is retrieved speeds up negotiation (450). In an alternative, component server 501 can pass all resource information from component 502 to client application 301 at once.

Application 301 decides based on the resource information provided in the XML data structures whether to execute the component 502 locally on client 300 or remotely on server 501. Application 301 defines what resource information is relevant for the decision on where to execute the component 502. Some resource information is optional, for example, resource information about a potential performance increase when the component 502 executes locally on client 301 in comparison to executing remotely on server 501.

If the decision is to execute the component 502 or parts of the component 502 locally, the component 502 is transferred via the network 290, for example, by passing component code in the body part of a SOAP message, with TCP/IP as an underlying protocol, by storing the component code in an XML document, or by using a component transfer protocol. The component code can be transferred in source code format or in any compiled format.

Once the component code arrives at client 300, the component code is installed and executes automatically. For example, given a component written in Java programming language (source code format) and transferred as byte code (compiled format), application 301 stores the byte code locally on client 300 and generates an object from that byte code dynamically as the main part of an object factory pattern. Once the object is generated, the application 301 can use the component by calling the corresponding methods of the object.

In another embodiment, small programs, i.e., resource agents 503, 302, 303, are used to act on behalf of application 301 and component 502. This significantly reduces the additional code to write for both application and component developers.

Negotiation (450) takes place between the client-side resource agent 303 and the server-side resource agent 503. Once resource agents 303, 503 agree to transfer a component and to run the transferred component on client 300, resource agents 303, 503 provide transferal to client 300 object generation on client 300. Specifically, the process of getting a component is a call to client-side agent 303 that delivers the object as a result. In other examples, it is possible to run only one agent on either side of a transaction.

In another example, UDDI server 200 participates in the negotiation (450). Client application 301 and component 502 negotiate indirectly without resource agents. The negotiation is done between UDDI server 200 and client 300, e.g. the corresponding application 301. During registration (400) of the component, data (e.g., an XML data structure) is passed to UDDI server 200. When server 200 passes (402) the list of available components to client 300, the resource information is also passed to client 300. Client 300 decides, based on this resource information, whether to execute component 502 locally on client 300 or remotely on servers 200 or 501. Client 300 requests UDDI server 200 to select available components based on the resources of client 300. This offers new query possibilities, e.g., for server 200 to select only mobile components, if client 300 asked for this component type. Optionally, resource agent 302 in client 300 controls the resource query at server 200 and the corresponding response 401/402. Preferences concerning the negotiation (450) can be defined, so as to optimize performance, to optimize disk space, or to optimize network traffic.

In another example, application 301 is a set of components that work together. One or more interacting component forms an application. Application 301 is reduced to an application stub, e.g. a program that knows what components are necessary to form a complete application. Such an application stub uses described dynamic component transferal mechanism to dynamically build an application, including both local and/or remote components. This provides a mechanism for dynamic application composition, based on available resources on client computer system 300. Instead of an application stub, the same can be achieved using resource agents on the client 303 and/or server 503.

Figure 4:
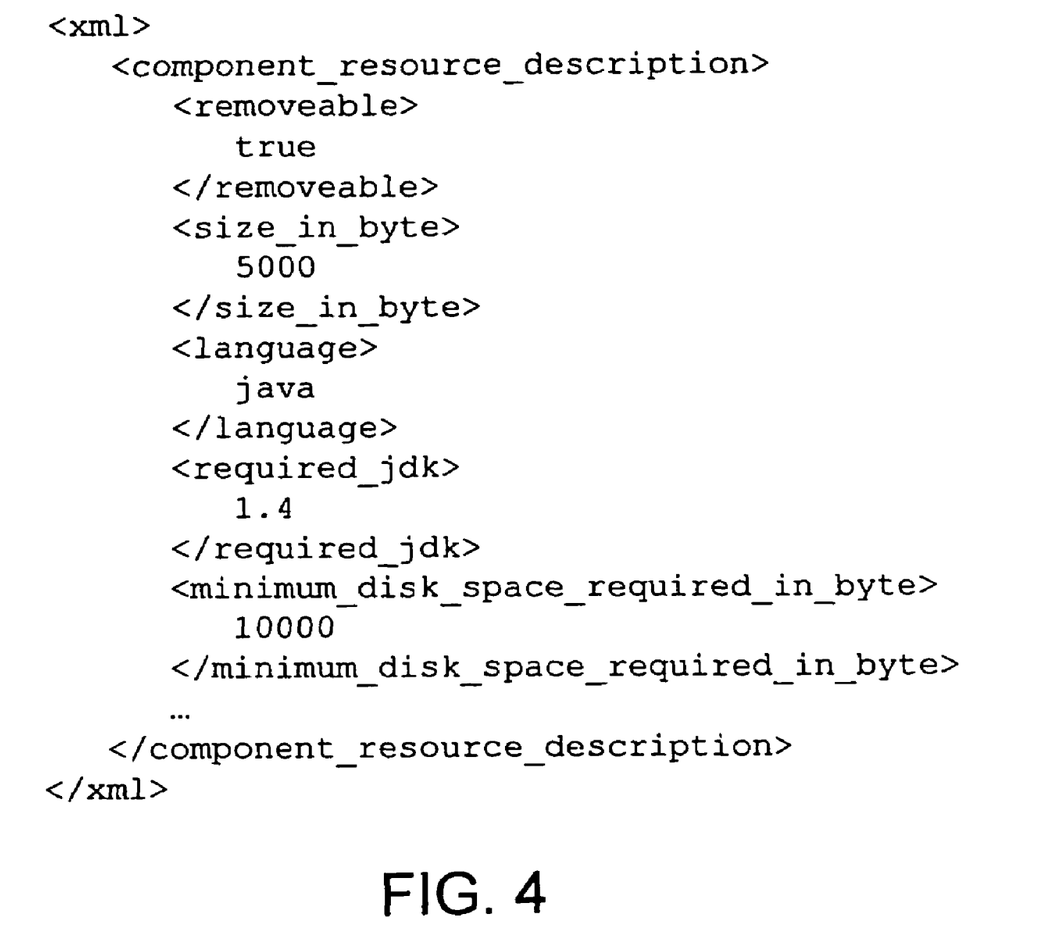
FIG. 4 is a first XML data structure.

In FIG. 4, the first XML data structure is shown. As mentioned above, the component 502 uses resource information during negotiation (450), for example, a yes/no indication about removeability from the server 501, an indication about the size (e.g., in bytes), an indication about the name of the programming language (e.g., Java) and a version (e.g., Java Development Kit JDK, version 1.4), an indication about minimum disk capacity that needed on client 300 (e.g., size in bytes).

Figure 5:
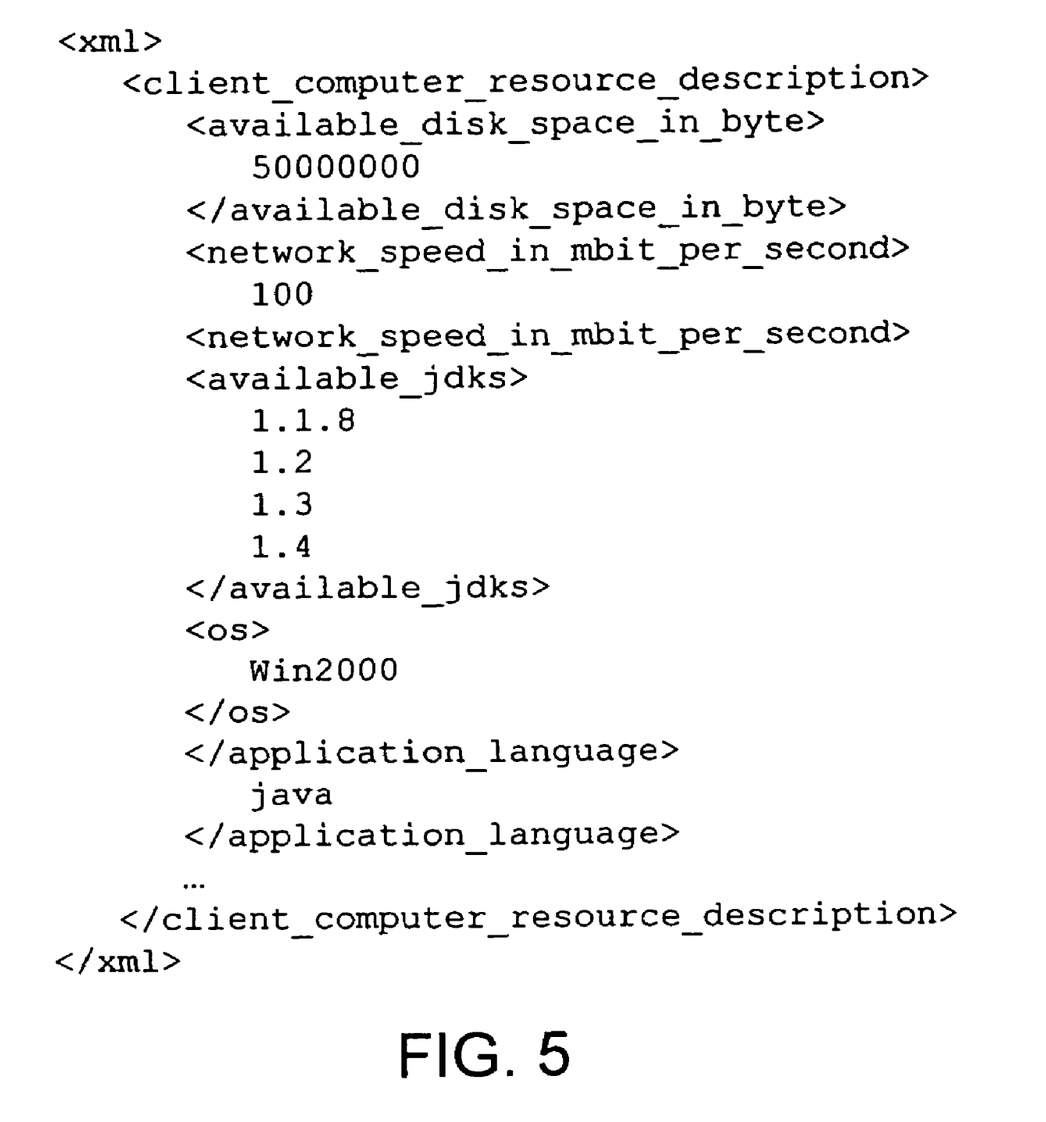
FIG. 5 is a second XML data structure.

In FIG. 5, the second XML data structure is shown. The second XML structure informs about client 300 and has indications including, for example, available disk space (e.g., in bytes), network speed (e.g., mega bit per second, determines time to transfer component), available JDK, operating system of client 300, and/or application language.

Figure 6:
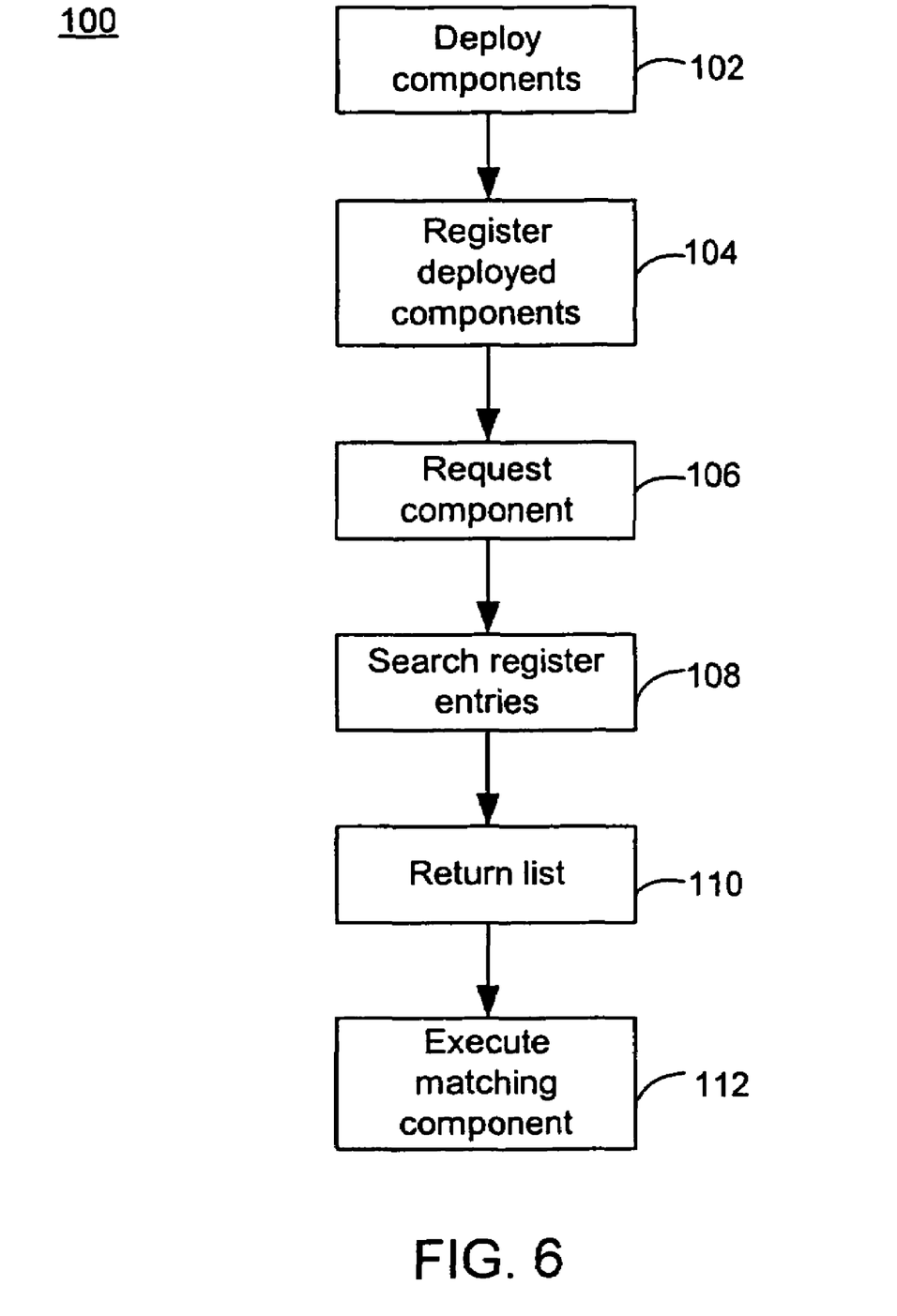
FIG. 6 is a flow diagram of the dynamic component transfer process of FIG. 1.

As shown in FIG. 6, the process 100 includes deploying (102) application software components on a first server in a network. The process 100 registers (104) the deployed components on a second server in the network. The second server can be a UDDI server and the components can be described in WSDL. Registering (104) can include a description of the component's location and the invocation of the component.

The process 100 requests (106) a particular one of the deployed components by sending a functionality specification of the particular component from a client system to the second server.

The process 100 searches (108) the second server for registered entries that match the functionality specification received. Searching (108) can use a UDDI description in WSDL in the second server.

The process 100 returns (110) a list of matching components to an application residing in the client system. Returning (110) can be accompanied by performing a negotiation between the client and the first server. The negotiation can use resource information about the components. The resource information can be stored in a text structure such as an XML data structure. The negotiation can include at least one resource agent. The one resource agent can involve a server-side agent and a client-side agent.

The process 100 executes (112) a matching component under control of the application. Execution (112) can also be controlled by resource agents. Execution (112) can include returning a result to the application. Execution (112) can occur on different systems within the network in response to the negotiation.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. Accordingly, other embodiments are within the scope of the following claims.

What is claimed is:

1. A method for automatically using computer software components by an application on a client computer that is connected to a computer network, the method comprising:
    deploying components on a first server;
    registering the components in a second server;
    sending a functionality specification from the client computer through the application to the second server, the functionality specification indicating functionality requested from the components registered in the second server;
    searching in the second server for register entries that match the functionality specification and preparing a list of components that match the functionality specification;
    returning the list of matching components to the application; and
    executing one of the matching components under control of the application.

2. The method of claim 1 wherein the registering is performed with the second server being a Universal Description, Discovery and Integration (UDDI) server.

3. The method of claim 2 wherein the registering is performed by describing the component in a web service description language (WSDL).

4. The method of claim 3 wherein the registering is performed by describing a location of the component and an invocation of the component.

5. The method of claim 1 wherein the searching further comprises using a UDDI description in WSDL in the second server.

6. The method of claim 1 wherein returning the list further comprises performing a negotiation between the client computer and the first server.

7. The method of claim 6 wherein performing the negotiation further comprises using resource information about the client computer and the first server.

8. The method of claim 7 wherein using the resource information further comprises reading a text structure.

9. The method of claim 8 wherein using the resource information further comprises reading the text structure as an XML structure.

10. The method of claim 9 wherein reading the XML structure further comprises reading indications from a group including removeability, size, language, language version, disk capacity, processor speed, operating system, and details of applications.

11. The method of claim 6 wherein performing the negotiation further comprises at least one resource agent negotiating on the client computer, first server, or both.

12. The method of claim 11 wherein the resource agent further comprises a server-side agent and a client-side agent.

13. The method of claim 11 wherein the resource agent controls component execution.

14. The method of claim 1 wherein the executing further comprises accessing the matching component by a simple object access protocol (SOAP).

15. The method of claim 1 wherein the executing further comprises composing an application from a plurality of the registered components.

16. The method of claim 15 wherein composing the application comprises dynamically building the application using an application stub on the client computer.

17. A computer program product, tangibly stored on a computer-readable medium, comprising instructions operable to cause a programmable processor to carry out a method for automatically using computer software components by an application on a client computer, the method comprising:
    deploying components on a first server;
    registering the components in a second server;
    sending a functionality specification from the client computer through the application to the second server, the functionality specification indicating functionality requested from the components registered in the second server;
    searching in the second server for register entries that match the functionality specification and preparing a list of components that match the functionality specification;
    returning the list of matching components to the application; and
    executing one of the matching components under control of the application.

18. The product of claim 17 wherein the registering is performed with the second server being a Universal Description, Discovery and Integration (UDDI) server.

19. A first server comprising:
    a storage device for storing components deployed on the first server which are registered on a second server; and
    a network interface for communicating with an application on a client computer,
    wherein the client computer sends a functionality specification through the application on the client computer to the second server, the functionality specification indicating functionality requested from the components registered in the second server,
    wherein a list is returned by the second server to the application, the list being a list of components that are deployed on the first server and that are registered in the second server as matching the functionality specification, and
    one of the matching components deployed on the first server is executed under control of the application.

20. A second server comprising:
- a storage device for registering components on the second server which are deployed on a first server; and
- a network interface for receiving a functionality specification from an application on a client computer, the functionality specification indicating functionality requested from the components registered on the second server,
- wherein the second server is configured to search for register entries that match the functionality specification, prepare a list of components deployed on the first server that match the functionality specification, and return the list of matching components to the application, and
- one of the matching components deployed on the first server is executed under control of the application.

21. A system comprising:
- a first server comprising (i) a first storage device for storing components deployed on the first server and (ii) a first network interface for communicating with an application on a client computer; and
- a second server comprising (i) a second storage device for registering the components deployed on the first server and (ii) a second network interface for receiving a functionality specification from the application on the client computer, the functionality specification indicating functionality requested from the components registered in the second server,
- wherein the second server is configured to search for register entries that match the functionality specification, prepare a list of components deployed on the first server that match the functionality specification, and return the list of matching components to the application, and
- one of the matching components deployed on the first server is executed under control of the application.

* * * * *